US012626932B2

(12) United States Patent
Omori et al.

(10) Patent No.: US 12,626,932 B2
(45) Date of Patent: May 12, 2026

(54) FUEL CELL SEPARATOR MEMBER AND FUEL CELL STACK

(71) Applicant: HONDA MOTOR CO., LTD., Tokyo (JP)

(72) Inventors: Suguru Omori, Wako (JP); Yasuhiro Nagai, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 583 days.

(21) Appl. No.: 18/144,996

(22) Filed: May 9, 2023

(65) Prior Publication Data

US 2023/0395822 A1 Dec. 7, 2023

(30) Foreign Application Priority Data

May 13, 2022 (JP) ................................. 2022-079144

(51) Int. Cl.
*H01M 8/0206* (2016.01)
*H01M 8/0247* (2016.01)
*H01M 8/2465* (2016.01)

(52) U.S. Cl.
CPC ....... *H01M 8/0247* (2013.01); *H01M 8/0206* (2013.01); *H01M 8/2465* (2013.01)

(58) Field of Classification Search
CPC ............ H01M 8/0206; H01M 8/0247; H01M 8/0273; H01M 8/0297; H01M 8/242; H01M 8/2465
See application file for complete search history.

(56) References Cited

U.S. PATENT DOCUMENTS

| | | | |
|---|---|---|---|
| 10,629,937 B2 * | 4/2020 | Ohmori | ................. H01M 8/248 |
| 2019/0319280 A1 * | 10/2019 | Ohmori | ............... H01M 8/0276 |

FOREIGN PATENT DOCUMENTS

JP 2013-196849 A 9/2013

* cited by examiner

*Primary Examiner* — Kevin E Yoon
(74) *Attorney, Agent, or Firm* — Carrier, Shende & Associates P.C.; Joseph P. Carrier; Fulchand P. Shende

(57) ABSTRACT

A first positioning hole is formed in a first positioning portion of a separator member, which is a fuel cell separator member forming a fuel cell stack. The first positioning portion includes a reinforcing rib and a joint portion. The reinforcing rib extends linearly outside the first positioning hole and protrudes from each of a first metal separator and a second metal separator. The joint portion is located between the reinforcing rib and the first positioning hole, and the first metal separator and the second metal separator are joined together at the joint portion.

9 Claims, 14 Drawing Sheets

OXYGEN-CONTAINING GAS

COOLANT

FUEL GAS

OXYGEN-CONTAINING GAS

COOLANT

FUEL GAS

FUEL CELL SEPARATOR MEMBER AND FUEL CELL STACK

CROSS-REFERENCE TO RELATED APPLICATIONS

This application is based upon and claims the benefit of priority from Japanese Patent Application No. 2022-079144 filed on May 13, 2022, the contents of which are incorporated herein by reference.

BACKGROUND OF THE INVENTION

Field of the Invention

The present invention relates to a fuel cell separator member and a fuel cell stack.

Description of the Related Art

In recent years, research and development have been conducted on fuel cells that contribute to energy efficiency in order to ensure that more people have access to affordable, reliable, sustainable and modern energy. The fuel cell stack includes a stacked body in which fuel cell separator members and MEA (membrane electrode assembly) members are alternately stacked.

For example, JP 2013-196849 A discloses that, when MEA members and separator members are stacked, knock pins are passed through positioning holes formed in outer peripheral portions of the separator members to position the separator members in a direction orthogonal to a separator thickness direction.

SUMMARY OF THE INVENTION

However, in the related art as described above, there is a possibility that the outer peripheral portions of the separator members are deformed by the knock pins (positioning guides) coming into contact with the inner peripheral surfaces of the positioning holes.

An object of the present invention is to solve the aforementioned problem.

According to a first aspect of the present invention, there is provided a fuel cell separator member comprising a joint separator that comprises a pair of metal separators joined together, the joint separator including an outer peripheral portion provided with a positioning portion configured to position a plurality of stack units in a direction orthogonal to a separator thickness direction when the stack units are stacked on each other, the stack units each including the joint separator and a membrane electrode assembly member, wherein the positioning portion is formed with a positioning hole formed by cutting out the outer peripheral portion of the joint separator so as to open toward an outside of the joint separator, and the positioning portion includes: a reinforcing rib extending linearly outside the positioning hole and protruding in the separator thickness direction from at least one of the pair of metal separators; and a joint portion located between the reinforcing rib and the positioning hole and configured to join together the pair of metal separators.

According to a second aspect of the present invention, there is provided a fuel cell stack comprising a stacked body that comprises a plurality of stack units stacked on each other, the stack units each including a membrane electrode assembly member and a separator member, wherein the separator member is the fuel cell separator member described above.

According to a third aspect of the present invention, there is provided a fuel cell stack comprising a stacked body that comprises a first membrane electrode assembly member, a first separator member, a second membrane electrode assembly member, and a second separator member that are stacked in this order, wherein each of the first separator member and the second separator member is the fuel cell separator member described above, a cutout portion is formed in the outer peripheral portion of the joint separator, at a position adjacent to the positioning portion so as to open toward the outside of the joint separator, the cutout portion is larger than the positioning hole, and when viewed in a stacking direction of the first membrane electrode assembly member, the first separator member, the second membrane electrode assembly member, and the second separator member, an outline of the positioning hole of the first separator member is located inside an outline of the cutout portion of the second separator member, and an outline of the positioning hole of the second separator member is located inside an outline of the cutout portion of the first separator member.

According to the present invention, when the plurality of stack units are stacked on each other, the separator members can be accurately positioned in the direction orthogonal to the separator thickness direction by inserting the positioning guides into the positioning holes. Further, since the positioning portions each include the reinforcing rib and the joint portion, it is possible to increase the rigidity of the positioning portion. As a result, even when the positioning guide comes into contact with the hole wall portion that forms the positioning hole, it is possible to suppress deformation of the positioning portion (the outer peripheral portion of the separator member).

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

Figure 1:
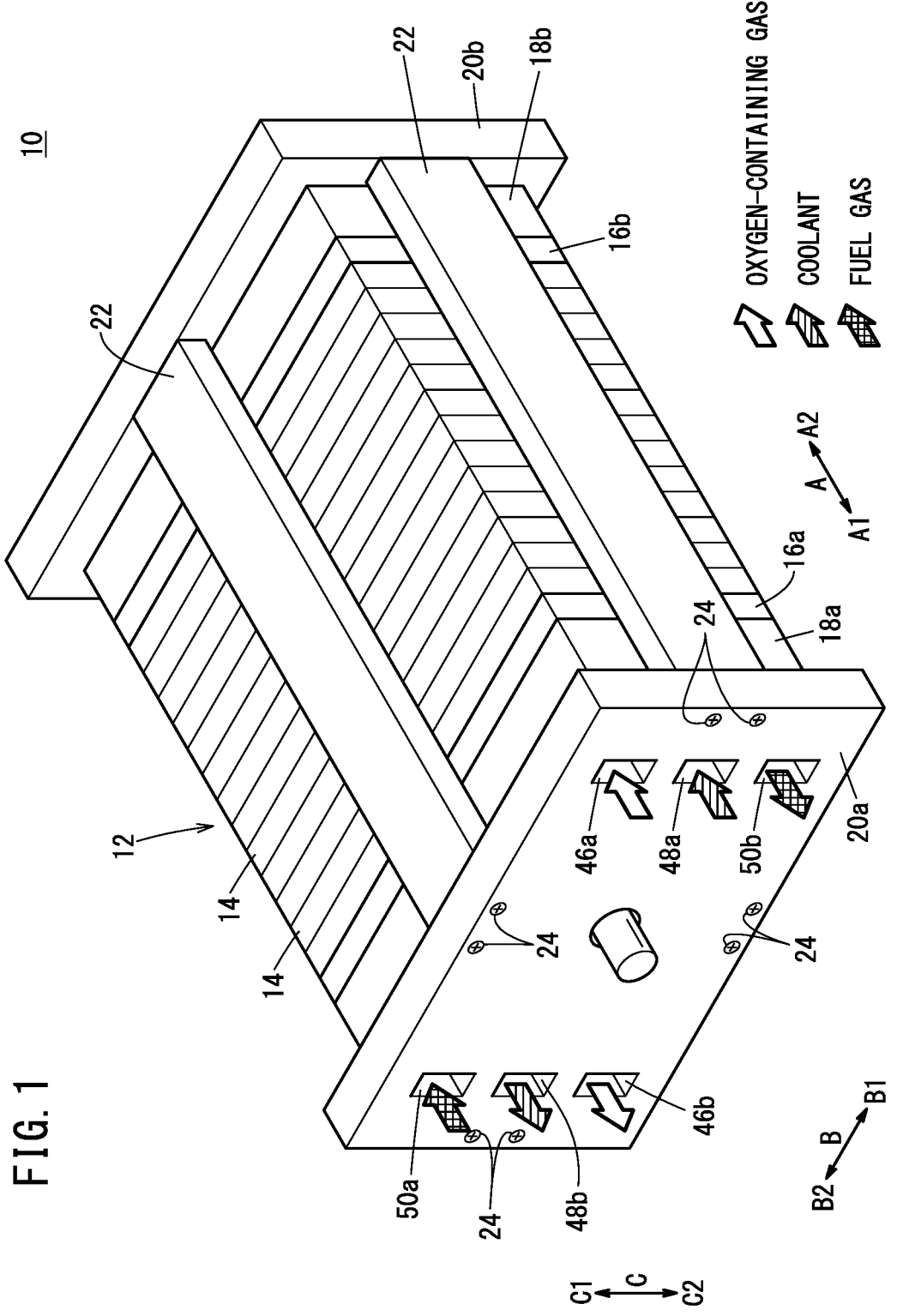
FIG. 1 is a perspective view of a fuel cell stack according to an embodiment of the present invention.

As shown in FIG. 1, a fuel cell stack 10 according to an embodiment of the present invention includes a stacked body 12. The stacked body 12 includes a plurality of power generation cells 14 stacked in a horizontal direction (arrow A direction). Each power generation cell 14 constitutes a unit fuel cell. The fuel cell stack 10, for example, is mounted in a fuel cell vehicle such as a fuel cell electric automobile (not shown).

A terminal plate 16a, an insulator 18a, and an end plate are arranged in this order sequentially toward the outside on one end of the stacked body 12 in a stacking direction (an end of the stacked body 12 in an arrow A1 direction). A terminal plate 16b, an insulator 18b, and an end plate 20b are arranged in this order sequentially toward the outside on the other end of the stacked body 12 in the stacking direction (an end of the stacked body 12 in an arrow A2 direction). Connecting bars 22 are disposed respectively between corresponding sides of the end plate 20a and the end plate 20b. The terminal plates 16a and 16b are each made of an electrically conductive material.

The end plates 20a and 20b each have a laterally elongated rectangular shape. Both ends of each connecting bar 22 are fixed to the inner surfaces of the end plates 20a and 20b via bolts 24. As a result, a compressive load in the stacking direction (the arrow A direction) is applied to the stacked body 12. The fuel cell stack 10 may include a casing having the two end plates 20a and 20b as its end plates. In this case, the stacked body 12 is accommodated in the casing.

Figure 2:
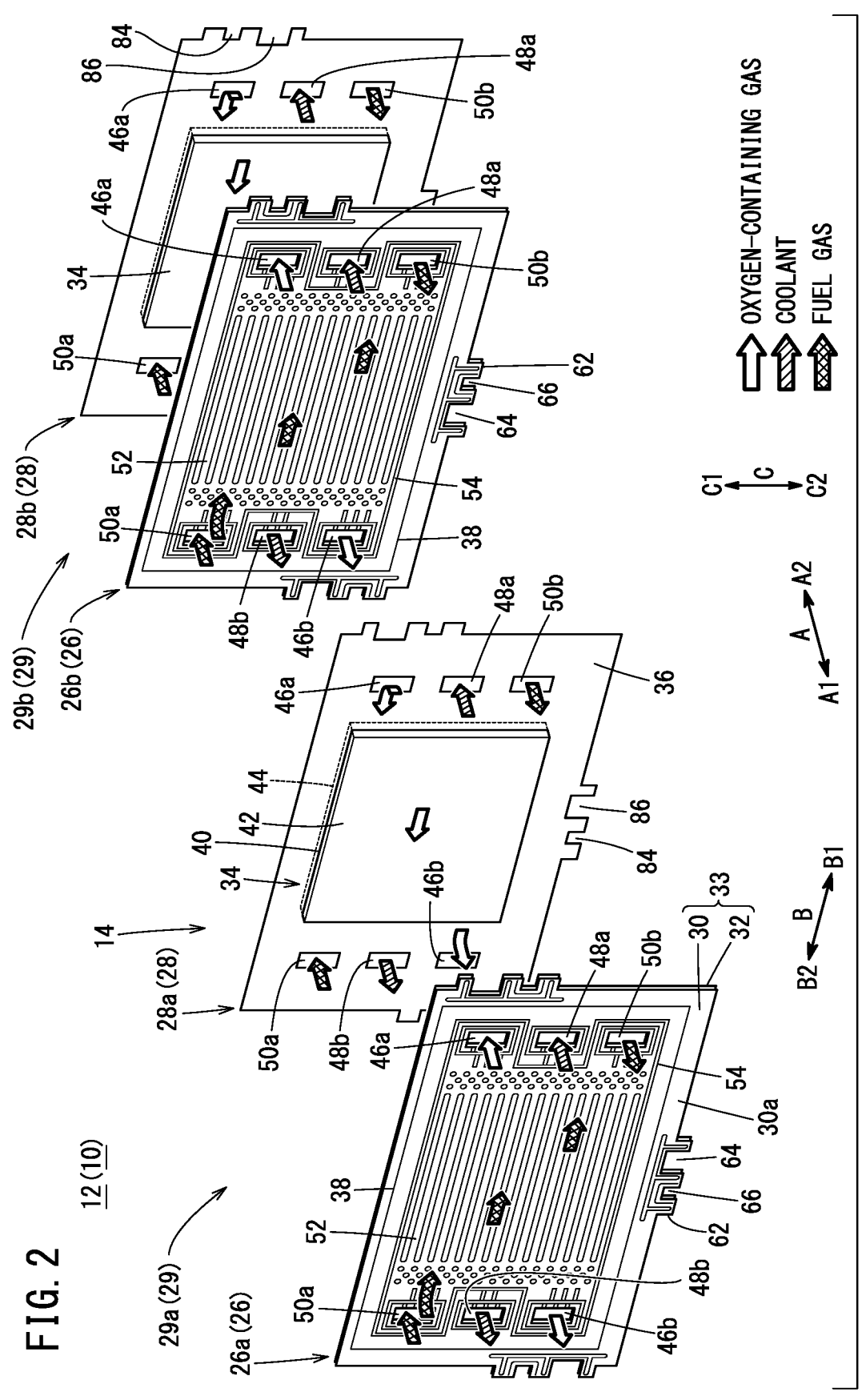
FIG. 2 is a first partially exploded perspective view of the fuel cell stack of FIG. 1.
Figure 3:
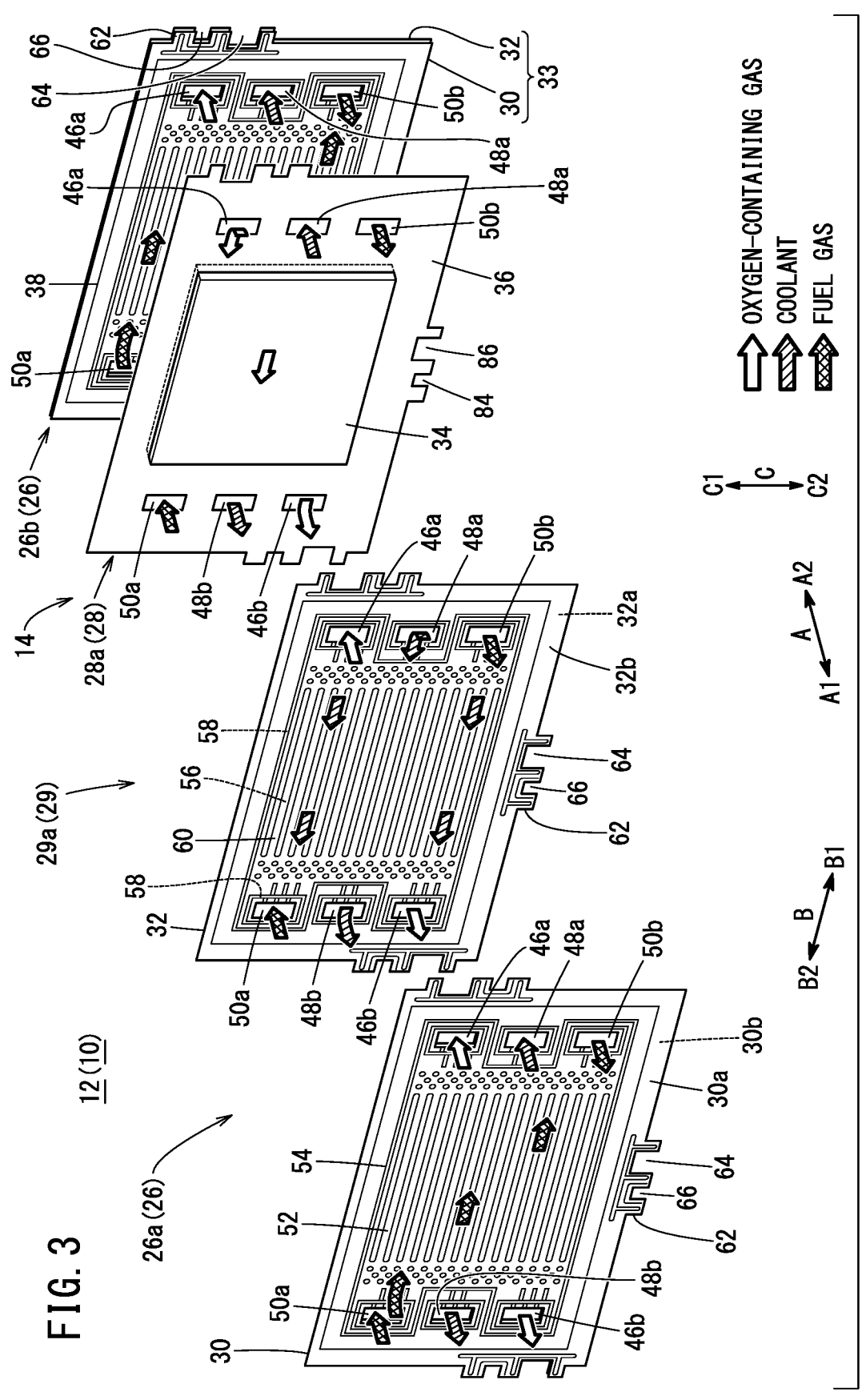
FIG. 3 is a second partially exploded perspective view of the fuel cell stack of FIG. 1.

As shown in FIGS. 2 and 3, the stacked body 12 is formed by stacking a first separator member 26a, a first MEA member 28a, a second separator member 26b, and a second MEA member 28b in the arrow A direction.

The first separator member 26a and the second separator member 26b have the same basic configuration, but are different from each other in the arrangement of a first positioning hole 66 and a first cutout portion 64, which will be described later. The first MEA member 28a and the second MEA member 28b have the same basic configuration, but are different from each other in the arrangement of a second positioning hole 84 and a second cutout portion 86.

In the following description, the first separator member 26a and the second separator member 26b may be simply referred to as a "separator member 26" when they are not particularly distinguished from each other, and the first MEA member 28a and the second MEA member 28b may be simply referred to as an "MEA member 28" when they are not particularly distinguished from each other. The stacked body 12 is formed by alternately stacking the separator members 26 and the MEA members 28. The separator member 26 is a fuel cell separator member.

In addition, the first separator member 26a and the first MEA member 28a are joined together to form a first stack unit 29a, and the second separator member 26b and the second MEA member 28b are joined together to form a second stack unit 29b. The first stack unit 29a and the second stack unit 29b may be simply referred to as a "stack unit 29" when they are not particularly distinguished from each other.

In FIG. 3, the power generation cell 14 is laterally elongated. The power generation cell 14 includes the MEA member 28, a first metal separator 30, and a second metal separator 32. The MEA member 28 includes a MEA (membrane electrode assembly) 34 and a resin film 36.

The first metal separator 30 is adjacent to the MEA member 28 in the arrow A2 direction. The second metal separator 32 is adjacent to the MEA member 28 in the arrow A1 direction. The first metal separator 30 and the second metal separator 32 sandwich and hold the MEA member 28 in the arrow A direction.

The first metal separator 30 and the second metal separator 32 are joined together to form a joint separator 33. The joint separator 33 includes an outer peripheral joint line 38 obtained by overlapping and joining together the outer peripheral portion of the first metal separator 30 and the outer peripheral portion of the second metal separator 32 (see FIG. 2). The outer peripheral joint line 38 is formed by welding, brazing, crimping or the like. The joint separator 33 may include a joint line other than the outer peripheral joint line 38.

The MEA 34 includes an electrolyte membrane 40, a cathode 42, and an anode 44. The electrolyte membrane 40, for example, is a solid polymer electrolyte membrane (cation exchange membrane). The solid polymer electrolyte membrane is formed by impregnating a thin membrane of perfluorosulfonic acid with water, for example. A fluorine based electrolyte may be used as the electrolyte membrane 40. Alternatively, a HC (hydrocarbon) based electrolyte may be used as the electrolyte membrane 40. The electrolyte membrane 40 is sandwiched and held between the cathode 42 and the anode 44.

The resin film 36 surrounds the outer peripheral portion of the MEA 34. The resin film 36 has electrical insulation properties. As the constituent material of the resin film 36, there may be cited, for example, PPS (polyphenylene sulfide), PPA (polyphthalamide), PEN (polyethylene naphthalate), PES (polyethersulfone), LCP (liquid crystal polymer), PVDF (polyvinylidene fluoride), silicone resin, fluorine resin, m-PPE (modified polyphenylene ether), PET (polyethylene terephthalate), PBT (polybutylene terephthalate), modified polyolefin, or the like.

At one edge portion of the power generation cell 14 in a long-side direction thereof (an edge portion of the power generation cell 14 in an arrow B1 direction), an oxygen-containing gas supply passage 46a, a coolant supply passage 48a, and a fuel gas discharge passage 50b are provided. The oxygen-containing gas supply passage 46a, the coolant supply passage 48a, and the fuel gas discharge passage 50b are arranged in a short-side direction of the power generation cell 14 (an arrow C direction).

An oxygen-containing gas flows through the oxygen-containing gas supply passage 46a toward the arrow A2 direction. A coolant (for example, pure water, ethylene glycol, oil, or the like) flows through the coolant supply passage 48a toward the arrow A2 direction. A fuel gas (for example, a hydrogen-containing gas) flows through the fuel gas discharge passage 50b toward the arrow A1 direction.

At another edge portion of the power generation cell 14 in the long-side direction (an edge portion of the power generation cell 14 in an arrow B2 direction), a fuel gas supply passage 50a, a coolant discharge passage 48b, and an oxygen-containing gas discharge passage 46b are provided. The fuel gas supply passage 50a, the coolant discharge passage 48b, and the oxygen-containing gas discharge passage 46b are arranged in the short-side direction of the power generation cell 14 (the arrow C direction).

The fuel gas flows through the fuel gas supply passage 50a toward the arrow A2 direction. The coolant flows through the coolant discharge passage 48b toward the arrow A1 direction. The oxygen-containing gas flows through the oxygen-containing gas discharge passage 46b toward the arrow A1 direction.

The oxygen-containing gas supply passage 46a, the oxygen-containing gas discharge passage 46b, the coolant supply passage 48a, the coolant discharge passage 48b, the fuel gas supply passage 50a, and the fuel gas discharge passage 50b are also formed in each of the terminal plate 16a, the insulator 18a, and the end plate 20a (see FIG. 1). The arrangement, shape, and size of these passages (such as the oxygen-containing gas supply passage 46a) are not limited to those in the present embodiment, and may be appropriately set according to required specifications.

Figure 4:
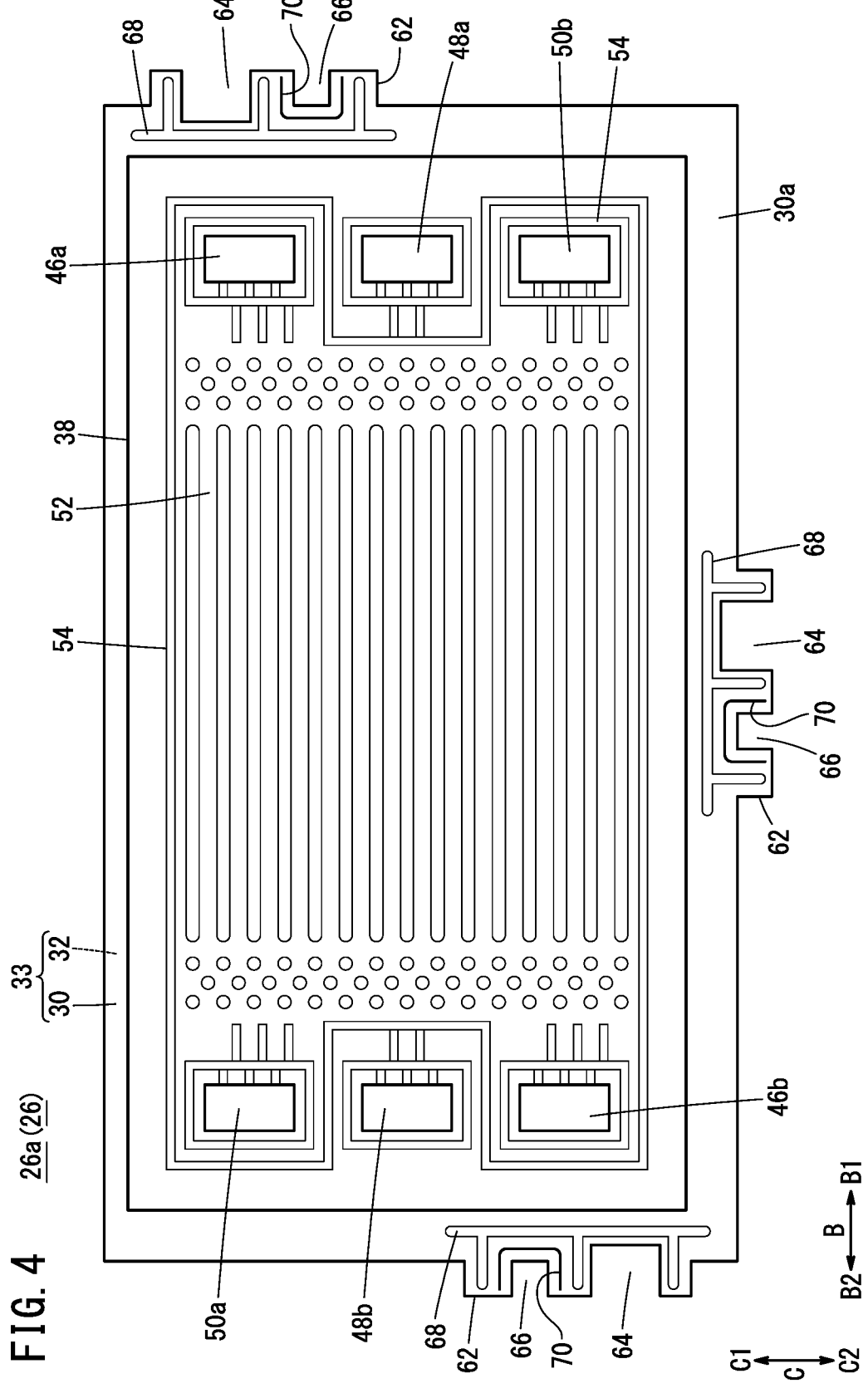
FIG. 4 is a plan view of a first separator member.

As shown in FIG. 4, the first metal separator 30 is, for example, a thin metal plate such as a steel plate, a stainless steel plate, or an aluminum plate. The surface of the first metal separator 30 may be subjected to anti-corrosion surface treatment. The first metal separator 30 is formed in a rectangular shape.

A fuel gas flow field 52 extending in the long-side direction of the power generation cell 14 (the arrow B direction) is provided on a surface of the first metal separator 30 that faces the MEA member 28 (hereinafter referred to as a "surface 30a"). The fuel gas flow field 52 is in fluid communication with the fuel gas supply passage 50a and the fuel gas discharge passage 50b. The fuel gas is supplied to the anode 44 through the fuel gas flow field 52.

First seal portions 54 for preventing leakage of fuel cell fluid, which is a reactant gas (oxygen-containing gas or fuel gas) or a coolant, are provided on the surface 30a of the first metal separator 30. The first seal portions 54 extend in a straight line shape when viewed in a separator thickness direction (the arrow A direction). However, the first seal portions 54 may extend in a wavy shape when viewed in the separator thickness direction.

The first seal portions 54 are formed by press-forming the first metal separator 30 so as to have a trapezoidal or rectangular cross section. The first seal portions 54 protrude from the first metal separator 30 toward the resin film 36. The first seal portions 54 are in airtight and liquid-tight contact with the resin film 36. A resin material may be applied to the protruding end surfaces of the first seal portions 54. Further, each of the first seal portions 54 is not limited to a so-called metal bead seal, but may be a rubber seal. The first seal portions 54 individually surround the plurality of passages (such as the oxygen-containing gas supply passage 46a). Further, the first seal portion 54 surrounds the fuel gas flow field 52.

As shown in FIG. 3, the second metal separator 32 is, for example, a thin metal plate such as a steel plate, a stainless steel plate, or an aluminum plate. The surface of the second metal separator 32 may be subjected to anti-corrosion surface treatment. The second metal separator 32 is formed in a rectangular shape.

An oxygen-containing gas flow field 56 extending in the long-side direction of the power generation cell 14 (the arrow B direction) is provided on a surface of the second metal separator 32 that faces the MEA member 28 (hereinafter referred to as a "surface 32a"). The oxygen-containing gas flow field 56 is in fluid communication with the oxygen-containing gas supply passage 46a and the oxygen-containing gas discharge passage 46b. The oxygen-containing gas is supplied to the cathode 42 through the oxygen-containing gas flow field 56.

Second seal portions 58 for preventing leakage of fuel cell fluid, which is a reactant gas (oxygen-containing gas or fuel gas) or a coolant, are provided on the surface 32a of the second metal separator 32. The second seal portions 58 extend in a straight line shape when viewed in the separator thickness direction (the arrow A direction). However, the second seal portions 58 may extend in a wavy shape when viewed in the separator thickness direction.

The second seal portions 58 are formed by press-forming the second metal separator 32 so as to have a trapezoidal or rectangular cross section. The second seal portions 58 protrude from the second metal separator 32 toward the resin film 36. The second seal portions 58 are in airtight and liquid-tight contact with the resin film 36. A resin material may be applied to the protruding end surfaces of the second seal portions 58. Further, each of the second seal portions 58 is not limited to a so-called metal bead seal, but may be a rubber seal. The second seal portions 58 individually surround the plurality of passages (such as the oxygen-containing gas supply passage 46a). Further, the second seal portion 58 surrounds the oxygen-containing gas flow field 56.

A coolant flow field 60, which is in fluid communication with the coolant supply passage 48a and the coolant discharge passage 48b, is formed between a surface 30b of the first metal separator 30 and a surface 32b of the second metal separator 32 that are joined together.

As shown in FIG. 4, the first separator member 26a includes a plurality of first positioning portions 62 and a plurality of first cutout portions 64. In the present embodiment, the first separator member 26a includes three first positioning portions 62 and three first cutout portions 64. The first positioning portions 62 are located at the outer peripheral portion of the first separator member 26a. To be specific, the three first positioning portions 62 are provided at an end portion of the first separator member 26a in the arrow C direction (an end portion of the first separator member 26a in an arrow C2 direction) and at both end portions of the first separator member 26a in the arrow B direction. That is, the first positioning portion 62 is not provided at an end portion of the first separator member 26a in an arrow C1 direction.

Figure 5:
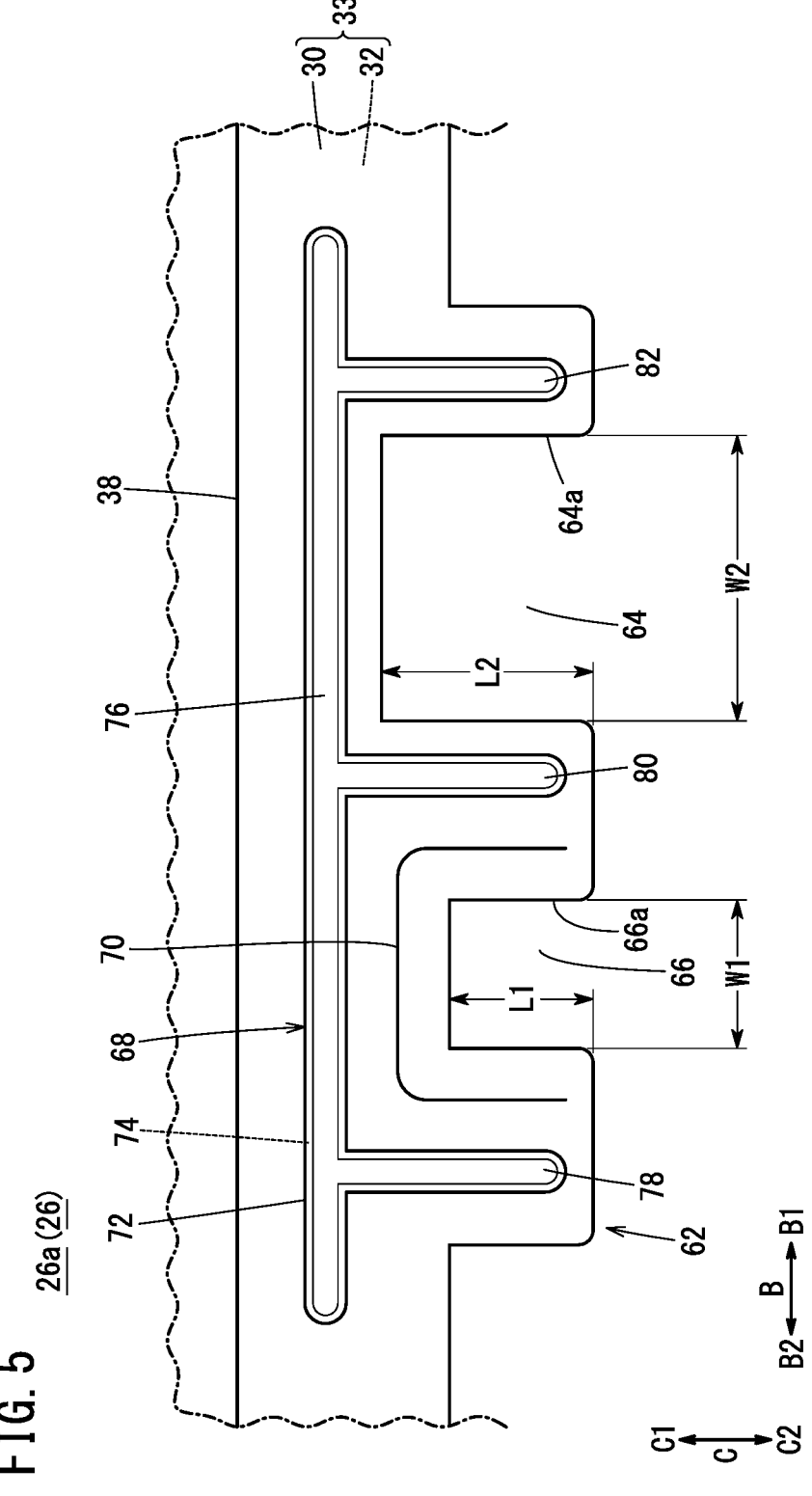
FIG. 5 is an explanatory plan view of a first positioning portion of the first separator member of FIG. 4.

As shown in FIG. 5, the first positioning hole 66 is formed in each of the first positioning portions 62. The first positioning hole 66 is formed by cutting out the outer peripheral portion of the joint separator 33 so as to open toward the outside of the joint separator 33. The first positioning hole 66 is formed in a quadrangular shape. A width W1 of the first positioning hole 66 is smaller than a width W2 of the first cutout portion 64. A length L1 of the first positioning hole 66 toward the inside of the joint separator 33 is smaller than a length L2 of the first cutout portion 64 toward the inside of the joint separator 33.

Figure 9:
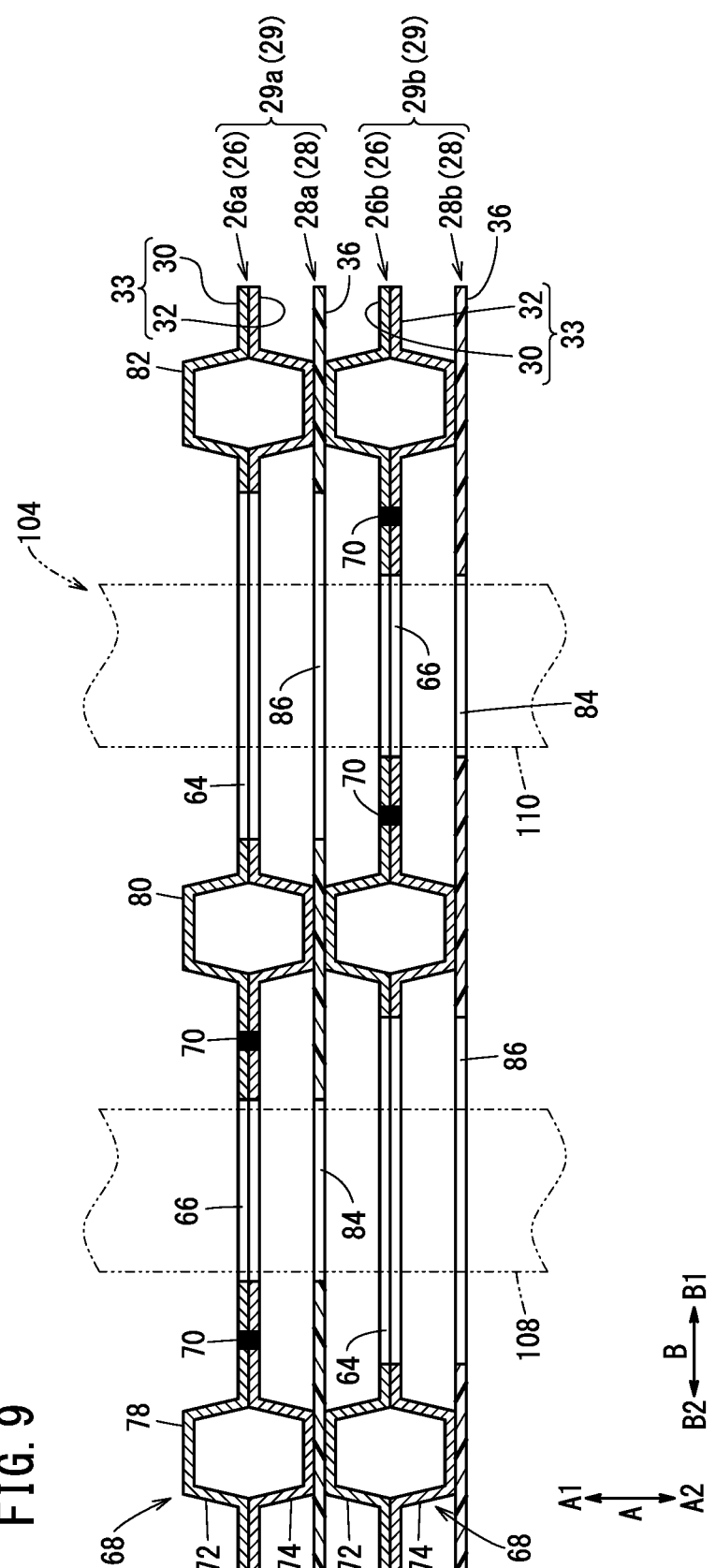
FIG. 9 is a cross-sectional view taken along line IX-IX of FIG. 8.

The first positioning portions 62 each include a reinforcing rib 68 and a joint portion 70. The reinforcing rib 68 extends linearly outside the first positioning hole 66. As shown in FIG. 9, the reinforcing rib 68 includes a first rib 72 and a second rib 74. The first rib 72 protrudes from the first metal separator 30 toward the first MEA member 28a (in the arrow A1 direction). The first rib 72 is integrally formed with the first metal separator 30 by press forming.

The protruding end surface of the first rib 72 of the first separator member 26a is in contact with one surface of the resin film 36 of the MEA member 28 in a state where a tightening load is applied to the stacked body 12. The protruding end surface of the second rib 74 is in contact with the other surface of the resin film 36 of the MEA member 28 in a state where the tightening load is applied to the stacked body 12. In the present embodiment, the resin film 36 of the MEA member 28 is sandwiched and held between the first rib 72 of the first separator member 26*a* and the second rib 74 of the second separator member 26*b*. However, the first rib 72 and the second rib 74 may be separated from the resin film 36.

As shown in FIG. 5, the first rib 72 includes a first linear rib 76 and three second linear ribs 78, 80, and 82. The first linear rib 76 extends in a straight line shape along the outer peripheral joint line 38. Each of the second linear ribs 78, 80, and 82 extends in a straight line shape from the first linear rib 76 toward the outside of the joint separator 33. The distal end portion of each of the second linear ribs 78, 80, and 82 is formed in an arc shape when viewed from the arrow A direction.

The three second linear ribs 78, 80, and 82 are spaced apart from each other in the extending direction of the first linear rib 76. The second linear rib 78 extends from a portion between one end and the center of the first linear rib 76 in the extending direction thereof. The second linear rib 80 extends from the center of the first linear rib 76 in the extending direction thereof. The second linear rib 82 extends from a portion between the other end and the center of the first linear rib 76 in the extending direction thereof. The extending ends of the second linear ribs 78, 80, and 82 are located inward of the outer periphery of the joint separator 33. The first positioning hole 66 is located between the second linear ribs 78 and 80 adjacent to each other. The first rib 72 is separated from the first positioning hole 66.

In FIG. 9, the second rib 74 protrudes from the second metal separator 32 toward the first MEA member 28*a* (in the arrow A2 direction). The second rib 74 is integrally formed with the second metal separator 32 by press forming. The second rib 74 has the same size and the same shape as the first rib 72. The first rib 72 and the second rib 74 are positioned so as to overlap each other when viewed from the separator thickness direction.

As shown in FIGS. 5 and 9, the joint portion 70 is located between the reinforcing rib 68 and the first positioning hole 66, and the first metal separator 30 and the second metal separator 32 are joined together at the joint portion 70. The joint portion 70 is formed by welding, brazing, or the like. The joint portion 70 is preferably formed by laser welding. The joint portion 70 extends in a straight line shape along the outline of the first positioning hole 66. The joint portion 70 is separated from the first positioning hole 66 and the reinforcing rib 68.

The three first cutout portions 64 are provided so as to be adjacent to the three first positioning portions 62, respectively (see FIG. 4). As shown in FIG. 5, each of the first cutout portions 64 is formed in a quadrangular shape. The first cutout portion 64 is larger than the first positioning hole 66. That is, the width W2 of the first cutout portion 64 is greater than the width W1 of the first positioning hole 66, and the length L2 of the first cutout portion 64 is greater than the length L1 of the first positioning hole 66. The first cutout portion 64 is positioned between the second linear rib and the second linear rib 82.

Figure 6:
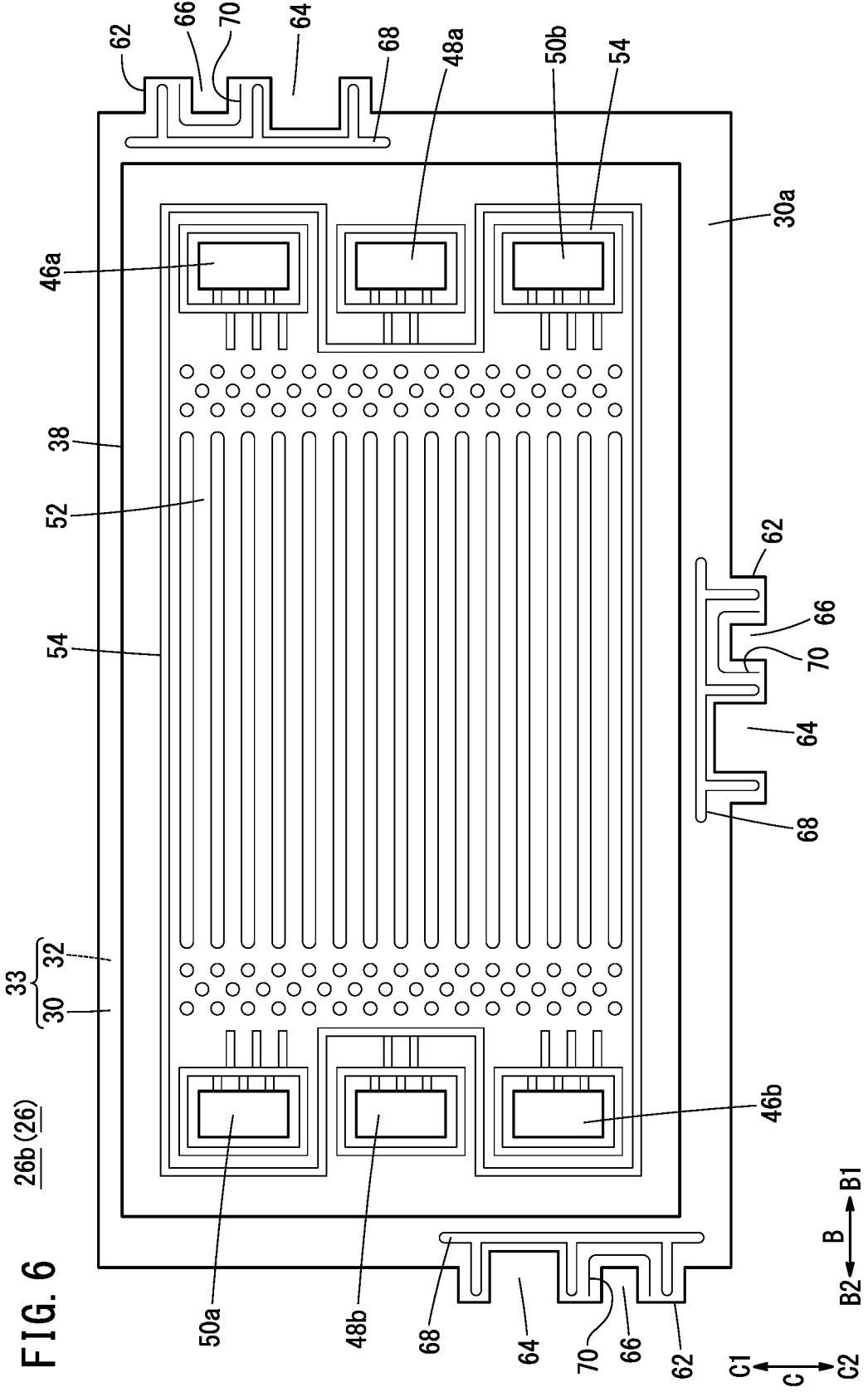
FIG. 6 is a plan view of a second separator member.
Figure 7:
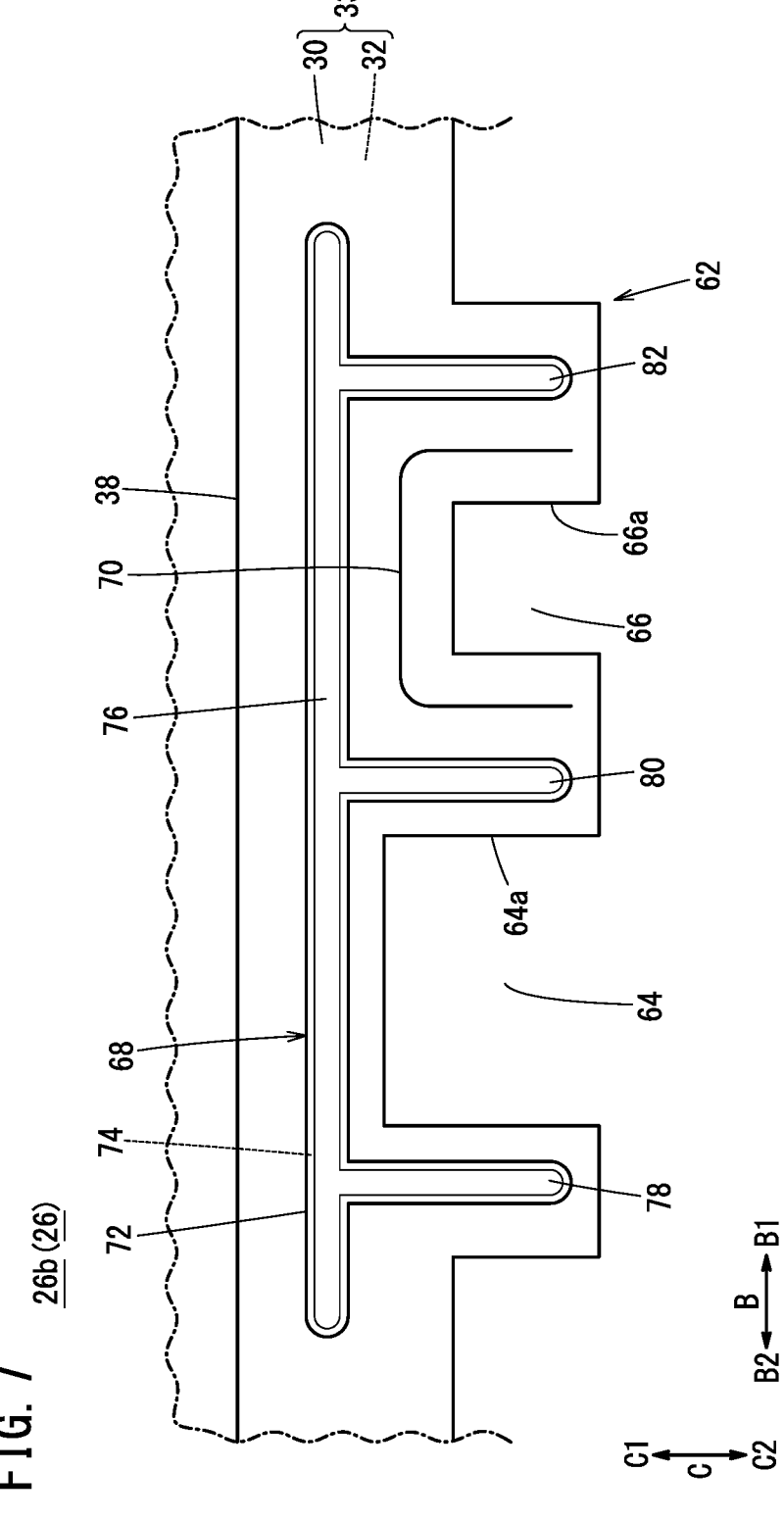
FIG. 7 is an explanatory plan view of a first positioning portion of the second separator member of FIG. 6.

As shown in FIG. 6, the second separator member 26*b* is different from the first separator member 26*a* only in the arrangement of the first positioning hole 66, the joint portion 70, and the first cutout portion 64 with respect to the joint separator 33. The second separator member 26*b* includes the same reinforcing rib 68 as that of the first separator member 26*a*.

As shown in FIGS. 6 to 9, in the second separator member 26*b*, the first positioning hole 66 is located between the second linear rib 80 and the second linear rib 82. The joint portion 70 is located between the first positioning hole 66 and the reinforcing rib 68. The first cutout portion 64 is located between the second linear rib 78 and the second linear rib 80. That is, in the second separator member 26*b*, the positional relationship between the first positioning hole 66 and the first cutout portion 64 adjacent to each other in the left-right direction is opposite to the positional relationship between the first positioning hole 66 and the first cutout portion 64 in the first separator member 26*a*.

As shown in FIGS. 2 and 9, the first MEA member 28*a* includes a plurality of second positioning holes 84 and a plurality of second cutout portions 86. In the present embodiment, the first MEA member 28*a* includes three second positioning holes 84 and three second cutout portions 86. The second positioning holes 84 and the second cutout portions 86 are provided in the outer peripheral portion of the resin film 36. The second positioning hole 84 has the same size and the same shape as the first positioning hole 66. The second cutout portion 86 has the same size and the same shape as the first cutout portion 64.

The three second positioning holes 84 of the first MEA member 28*a* are positioned so as to overlap the three first positioning holes 66 of the first separator member 26*a*, respectively, when viewed from the arrow A direction. The three second cutout portions 86 of the first MEA member 28*a* are positioned so as to overlap the three first cutout portions 64 of the first separator member 26*a*, respectively, when viewed from the arrow A direction. The first MEA member 28*a* and the first separator member 26*a* are joined together in an overlapped state to form the first stack unit 29*a*.

The second MEA member 28*b* is different from the first MEA member 28*a* only in the arrangement of the second positioning hole 84 and the second cutout portion 86 with respect to the resin film 36. The three second positioning holes 84 of the second MEA member 28*b* are positioned so as to overlap the three first positioning holes 66 of the second separator member 26*b*, respectively, when viewed from the arrow A direction. The three second cutout portions 86 of the second MEA member 28*b* are positioned so as to overlap the three first cutout portions 64 of the second separator member 26*b*, respectively, when viewed from the arrow A direction. The second MEA member 28*b* and the second separator member 26*b* are joined together in an overlapped state to form the second stack unit 29*b*.

Figure 8:
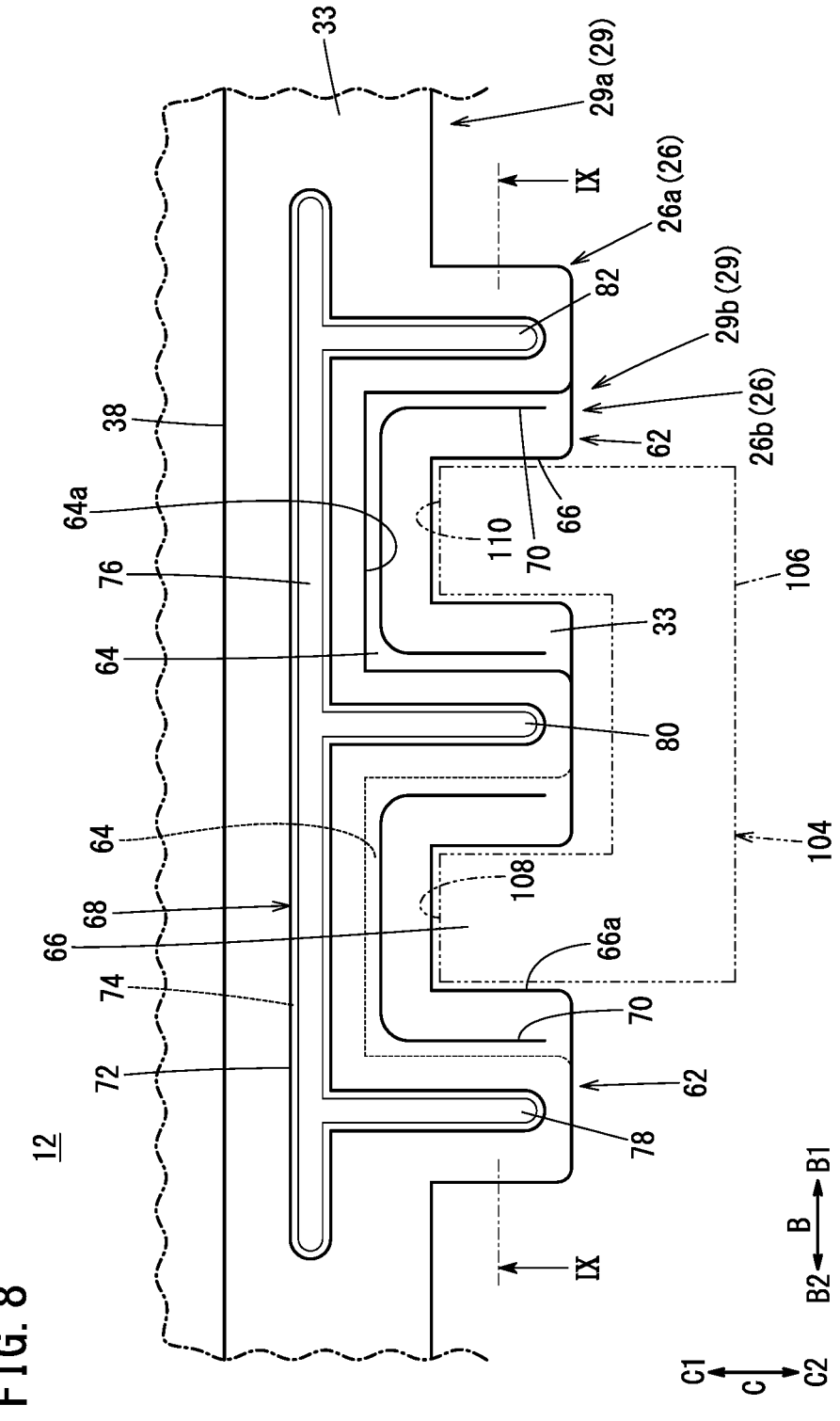
FIG. 8 is an explanatory plan view of the first positioning portion in a state where the first separator member and the second separator member are overlapped with each other.

As shown in FIGS. 8 and 9, when viewed from the arrow A direction, the outline of the first positioning hole 66 of the first separator member 26*a* is located inside the outline of the first cutout portion 64 of the second separator member 26*b*. When viewed from the arrow A direction, the outline of the first positioning hole 66 of the second separator member 26*b* is located inside the outline of the first cutout portion 64 of the first separator member 26*a*.

The fuel cell stack 10 configured as described above operates as follows.

First, as shown in FIG. 1, the fuel gas is supplied to the fuel gas supply passage 50*a* of the end plate 20*a*. The oxygen-containing gas is supplied to the oxygen-containing gas supply passage 46*a* of the end plate 20*a*. The coolant is supplied to the coolant supply passage 48*a* of the end plate 20*a*.

As shown in FIG. 2, the fuel gas is introduced into the fuel gas flow field 52 of the first metal separator 30 from the fuel gas supply passage 50a. The fuel gas is supplied to the anode 44 of the MEA 34 while flowing through the fuel gas flow field 52 in the arrow B1 direction.

On the other hand, as shown in FIG. 3, the oxygen-containing gas is introduced into the oxygen-containing gas flow field 56 of the second metal separator 32 from the oxygen-containing gas supply passage 46a. The oxygen-containing gas is supplied to the cathode 42 of the MEA 34 while flowing through the oxygen-containing gas flow field 56 in the arrow B2 direction.

In the MEA 34, the fuel gas supplied to the anode 44 and the oxygen-containing gas supplied to the cathode 42 are consumed in electrochemical reactions. As a result, power generation is performed. Then, the fuel gas supplied to, and partially consumed at the anode 44 is discharged as a fuel off-gas from the fuel gas flow field 52 to the fuel gas discharge passage 50b. The oxygen-containing gas partially consumed at the cathode 42 is discharged as an oxygen-containing off-gas from the oxygen-containing gas flow field 56 to the oxygen-containing gas discharge passage 46b.

The coolant supplied to the coolant supply passage 48a is introduced into the coolant flow field 60 formed between the first metal separator 30 and the second metal separator 32. After being introduced into the coolant flow field 60, the coolant flows in the arrow B direction. After cooling the MEA 34, the coolant is discharged from the coolant discharge passage 48b.

Next, a stacking device 100 for stacking a plurality of stack units 29 will be described.

Figure 10:
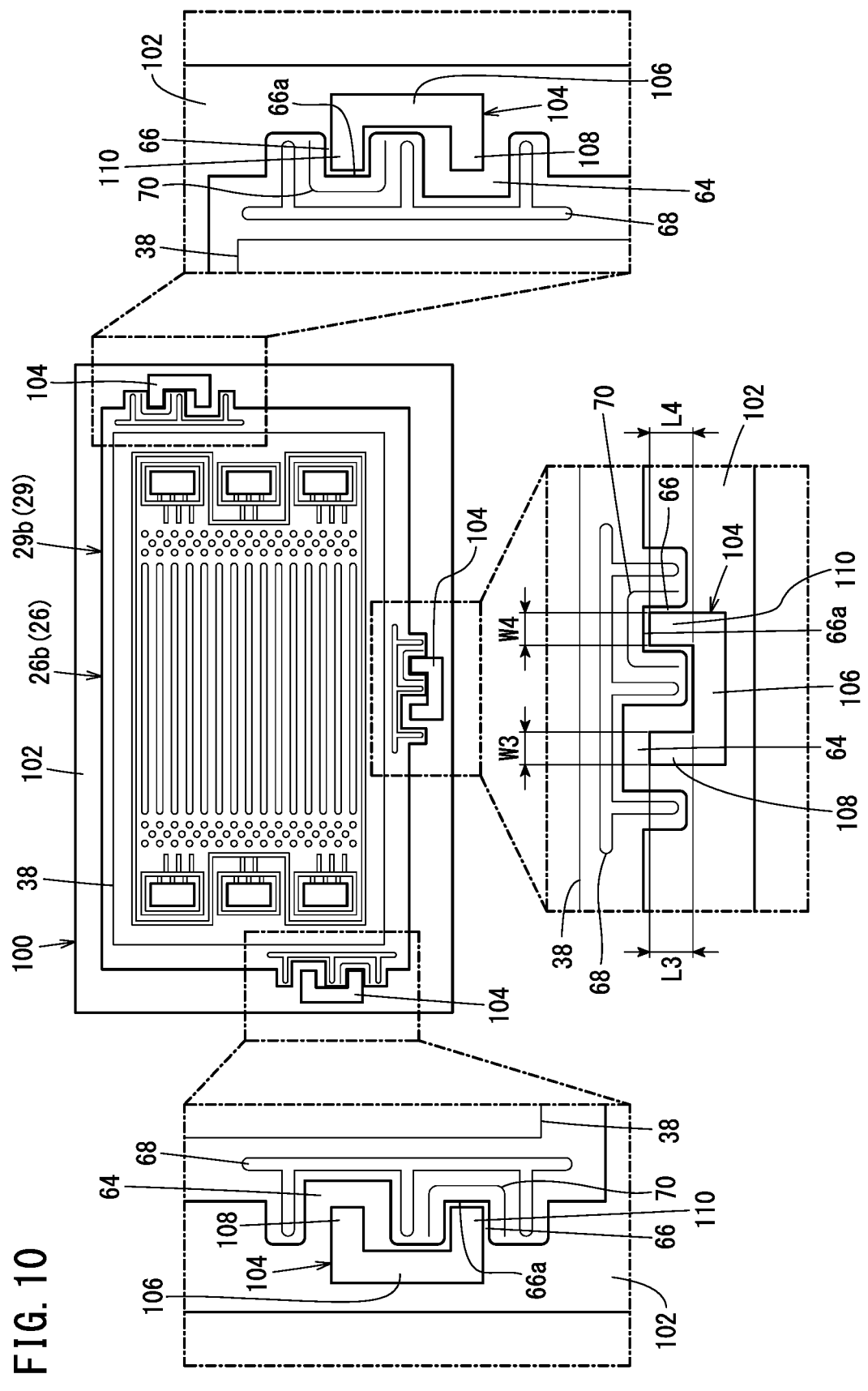
FIG. 10 is an explanatory plan view showing a state where the second separator member is placed on a mounting base of a stacking device.

As shown in FIG. 10, the stacking device 100 includes a mounting base 102 and three positioning guides 104. The mounting base 102 is formed in a rectangular shape in plan view from above. The outline of the mounting base 102 is located outside the outline of the separator member 26.

The positioning guides 104 extend upward in a straight line shape from the mounting base 102. The positioning guides 104 are fixed to the outer peripheral portion of the mounting base 102. The three positioning guides 104 are provided at one end portion of the mounting base 102 in a direction along the short side of the mounting base 102, and at both end portions of the mounting base 102 in a direction along the long side of the mounting base 102. The positioning guides 104 are each formed in a U shape in plan view from above. The positioning guides 104 each include a guide base 106, a first convex portion 108, and a second convex portion 110.

The guide base 106 extends along the outline of the mounting base 102. The first convex portion 108 protrudes from one end portion of the guide base 106 in the extending direction thereof toward the inside of the mounting base 102. The second convex portion 110 protrudes from the other end portion of the guide base 106 in the extending direction thereof toward the inside of the mounting base 102. Each of the first convex portion 108 and the second convex portion 110 has a shape corresponding to the shape of the first positioning hole 66. In other words, each of the first convex portion 108 and the second convex portion 110 has a quadrangular shape when viewed from above.

A width W3 of the first convex portion 108 (the length thereof along the extending direction of the guide base 106) is the same as a width W4 of the second convex portion 110 (the length thereof along the extending direction of the guide base 106). The widths W3 and W4 are slightly smaller than the width W1 of the first positioning hole 66. A protrusion length L3 of the first convex portion 108 from the guide base 106 is the same as a protrusion length L4 of the second convex portion 110 from the guide base 106. The protrusion lengths L3 and L4 are slightly shorter than the length L1 of the first positioning hole 66.

When the plurality of stack units 29 are stacked on each other, first, the second stack unit 29b is placed on the mounting base 102, for example.

When the second stack unit 29b is placed on the mounting base 102, the second convex portions 110 of the three positioning guides 104 are respectively inserted into the three first positioning holes 66 of the second separator member 26b and the three second positioning holes 84 of the second MEA member 28b. As a result, the second stack unit 29b is mounted on the mounting base 102 in a state of being accurately positioned in a direction orthogonal to the up-down direction. Further, the rigidity of each of the first positioning portions 62 of the second separator member 26b is increased by the reinforcing rib 68 and the joint portion 70. Therefore, even when the second convex portion 110 of the positioning guide 104 comes into contact with a hole wall portion 66a that forms the first positioning hole 66, it is possible to suppress deformation of the first positioning portion 62 of the second separator member 26b.

When the second stack unit 29b is placed on the mounting base 102, the first convex portions 108 of the three positioning guides 104 are respectively inserted into the three first cutout portions 64 of the second separator member 26b and the three second cutout portions 86 of the second MEA member 28b. At this time, since the first cutout portion 64 and the second cutout portion 86 are larger than the first positioning hole 66 and the second positioning hole 84, it is possible to prevent the first convex portion 108 from coming into contact with a cutout wall portion 64a that forms the first cutout portion 64 of the second separator member 26b.

Subsequently, the first stack unit 29a is placed on the second stack unit 29b. Specifically, the first convex portions 108 of the three positioning guides 104 are respectively inserted into the three first positioning holes 66 of the first separator member 26a and the three second positioning holes 84 of the first MEA member 28a. As a result, the first stack unit 29a is stacked on the second stack unit 29b in a state of being accurately positioned with respect to the second stack unit 29b. In addition, the rigidity of each of the first positioning portions 62 of the first separator member 26a is increased by the reinforcing rib 68 and the joint portion 70. Therefore, even when the first convex portion 108 of the positioning guide 104 comes into contact with the hole wall portion 66a that forms the first positioning hole 66, it is possible to suppress deformation of the first positioning portion 62 of the first separator member 26a.

When the first stack unit 29a is stacked on the second stack unit 29b, the second convex portions 110 of the three positioning guides 104 are respectively inserted into the three first cutout portions 64 of the first separator member 26a and the three second cutout portions 86 of the first MEA member 28a. At this time, since the first cutout portion 64 and the second cutout portion 86 are larger than the first positioning hole 66 and the second positioning hole 84, it is possible to prevent the second convex portion 110 from coming into contact with the cutout wall portion 64a that forms the first cutout portion 64 of the first separator member 26a.

In this way, by alternately stacking the second stack unit 29b and the first stack unit 29a, the stacked body 12 is manufactured. In the present embodiment, the three positioning guides 104 are not components of the fuel cell stack 10, but components of the stacking device 100. However, the fuel cell stack 10 may include the three positioning guides 104.

When the fuel cell stack 10 includes the three positioning guides 104, the positioning guides 104 are fixed to the inner surfaces of the two end plates 20a and 20b, for example. In addition, in order to prevent electrical contact between the first separator member 26a and the second separator member 26b, either the positioning guides 104 or the first positioning portions 62, or both the positioning guides 104 and the first positioning portions 62 are preferably coated with insulating films. According to such a configuration, when a collision load in the arrow B direction acts on the fuel cell stack 10, the first separator member 26a can be brought into contact with the first convex portions 108, and the second separator member 26b can be brought into contact with the second convex portions 110 (see FIG. 9). Therefore, it is possible to prevent the plurality of separator members 26 from being displaced from each other in the arrow B direction.

The present embodiment has the following effects.

According to the present embodiment, when the plurality of stack units 29 are stacked on each other, the stack units 29 can be accurately positioned in the direction orthogonal to the separator thickness direction by inserting the positioning guides 104 into the first positioning holes 66, respectively. Further, since the first positioning portions 62 each include the reinforcing rib 68 and the joint portion 70, it is possible to increase the rigidity of the first positioning portions 62. As a result, even when the positioning guide 104 comes into contact with the hole wall portion 66a that forms the first positioning hole 66, it is possible to suppress deformation of the first positioning portion 62 (the outer peripheral portion of the separator member 26).

The joint portion 70 extends linearly along the outline of the first positioning hole 66.

According to such a configuration, it is possible to efficiently increase the rigidity of the periphery of the first positioning hole 66 in the first positioning portion 62.

The joint portion 70 extends in a straight line shape.

According to such a configuration, the joint portion 70 can be easily provided in the first positioning portion 62.

In the fuel cell stack 10, the first cutout portion 64 is formed in the outer peripheral portion of the joint separator 33, at a position adjacent to the first positioning portion 62 so as to open toward the outside of the joint separator 33. The first cutout portion 64 is larger than the first positioning hole 66. When viewed in the stacking direction of the first MEA member 28a, the first separator member 26a, the second MEA member 28b, and the second separator member 26b, the outline of the first positioning hole 66 of the first separator member 26a is located inside the outline of the first cutout portion 64 of the second separator member 26b, and the outline of the first positioning hole 66 of the second separator member 26b is located inside the outline of the first cutout portion 64 of the first separator member 26a.

According to such a configuration, even when the first positioning portion 62 of the first separator member 26a comes into contact with the positioning guide 104 and is deformed, it is possible to prevent the deformed first positioning portion 62 from coming into contact with the second separator member 26b. In addition, even when the first positioning portion 62 of the second separator member 26b comes into contact with the positioning guide 104 and is deformed, it is possible to prevent the deformed first positioning portion 62 from coming into contact with the first separator member 26a. As a result, the first separator member 26a and the second separator member 26b located on both sides of the power generation cell 14 can be electrically insulated from each other.

(First Modification)

Next, a first positioning portion 62a according to a first modification will be described. In the first positioning portion 62a according to the first modification, the same components as those of the above-described first positioning portion 62 are denoted by the same reference numerals, and description thereof will be omitted. The same applies to second to fourth modifications described later.

Figure 11:
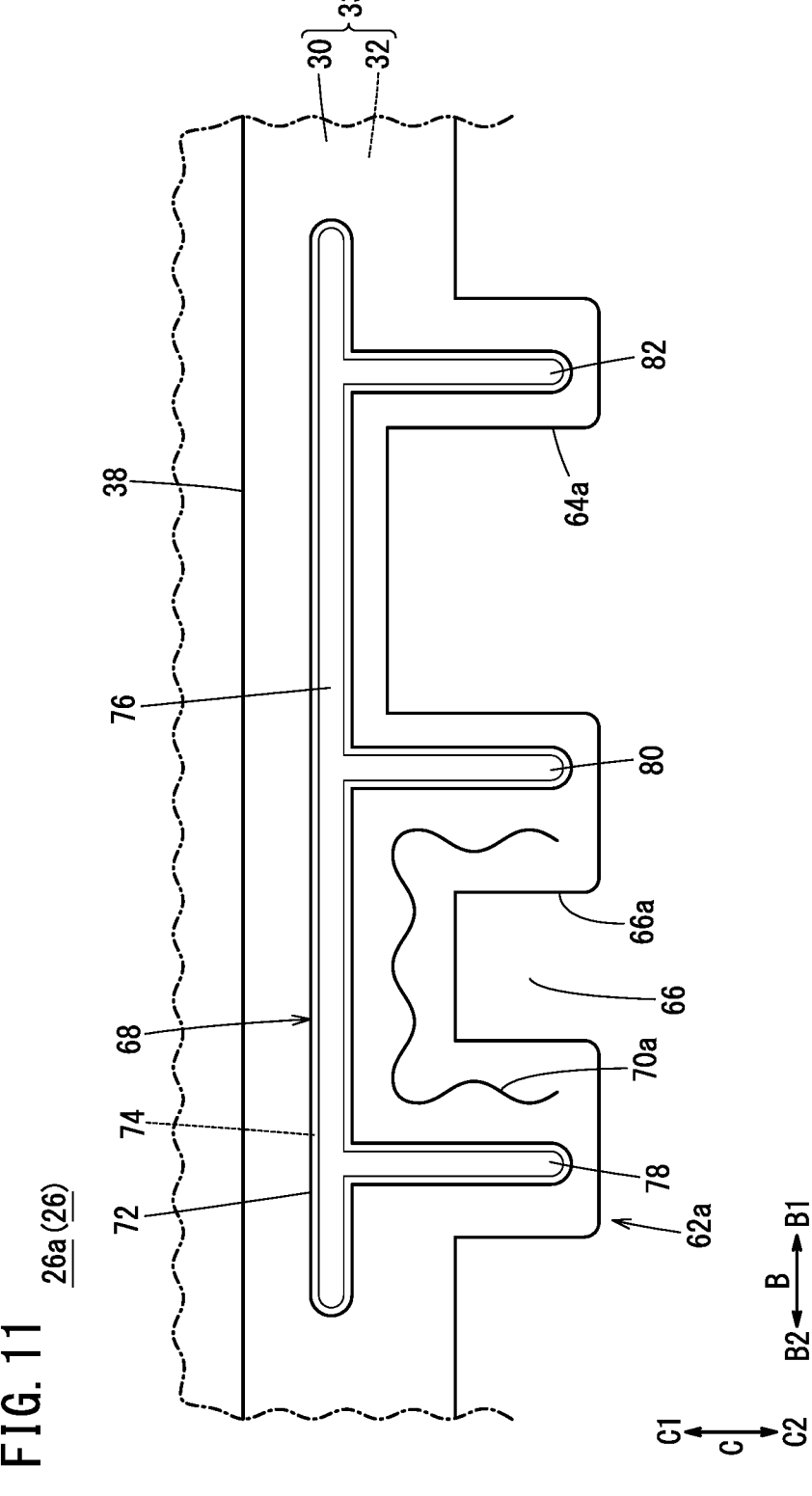
FIG. 11 is an explanatory plan view of a first positioning portion according to a first modification.

As shown in FIG. 11, the first positioning portion 62a includes the reinforcing rib 68 and a joint portion 70a. The joint portion 70a is located between the first positioning hole 66 and the reinforcing rib 68. The joint portion 70a extends in a wavy shape along the outline of the first positioning hole 66.

In the present modification, the joint portion 70a extends in a wavy shape. According to such a configuration, since the joining length can be increased compared to a case where the joint portion 70a extends in a straight line shape, the rigidity of the first positioning portion 62a can be further increased by the joint portion 70a.

(Second Modification)

Figure 12:
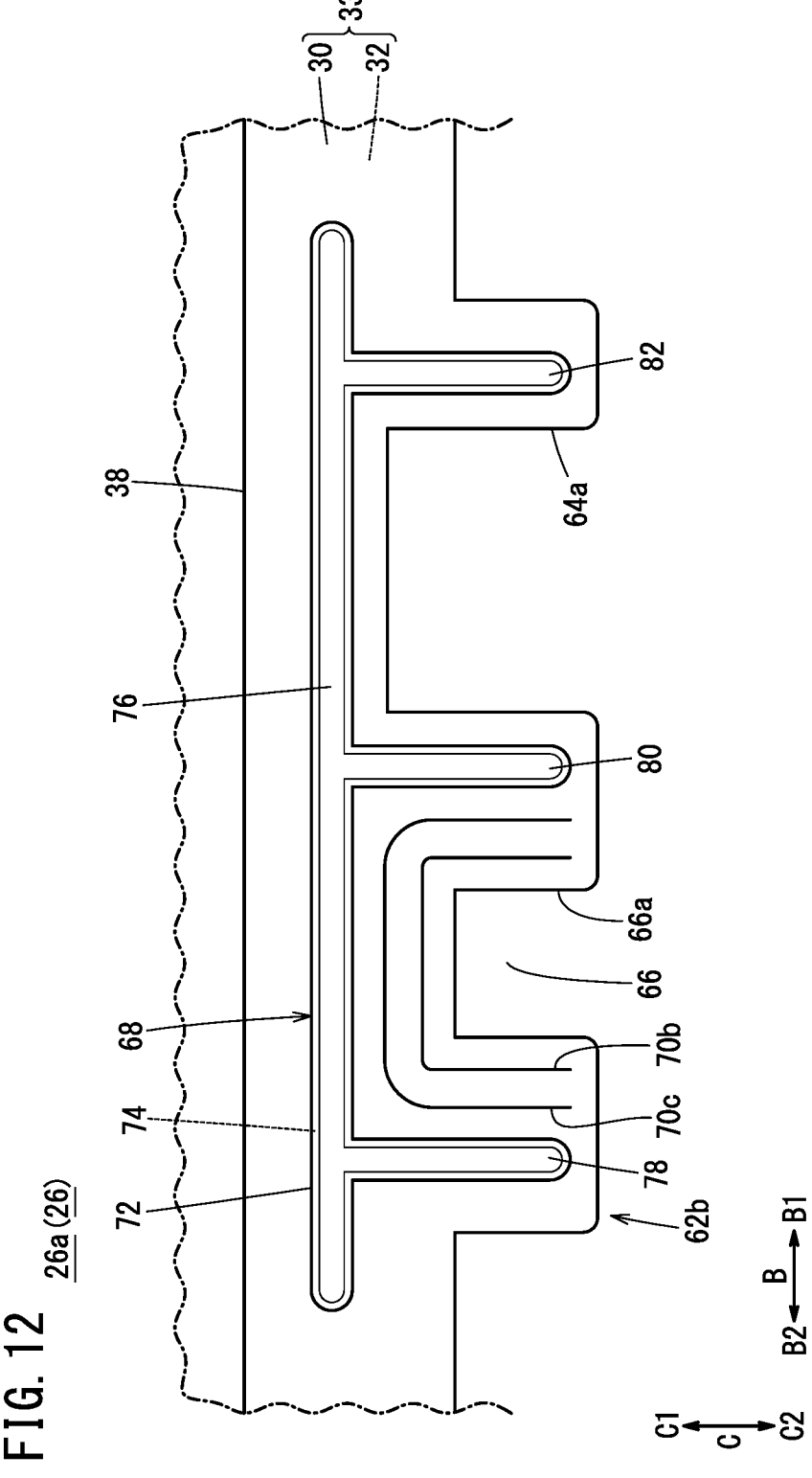
FIG. 12 is an explanatory plan view of a first positioning portion according to a second modification.

As shown in FIG. 12, a first positioning portion 62b according to a second modification includes the reinforcing rib 68 and two joint portions 70b and 70c. The two joint portions 70b and 70c are located between the first positioning hole 66 and the reinforcing rib 68. The joint portion 70b extends linearly (in a straight line shape) along the outline of the first positioning hole 66. The joint portion 70c is located between the joint portion 70b and the reinforcing rib 68. The joint portion 70c extends linearly (in a straight line shape) along the joint portion 70b. The joint portion 70c is separated from the joint portion 70b.

In the present modification, a plurality of (two) joint portions 70b and 70c are provided between the reinforcing rib 68 and the first positioning hole 66.

According to such a configuration, the rigidity of the first positioning portion 62b can be further increased by the plurality of joint portions 70b and 70c.

The present modification is not limited to the configuration described above. At least one of the two joint portions 70b and 70c may extend in a wavy shape in the same manner as the joint portion 70a according to the first modification. Further, the first positioning portion 62b may include three or more joint portions.

(Third Modification)

Figure 13:
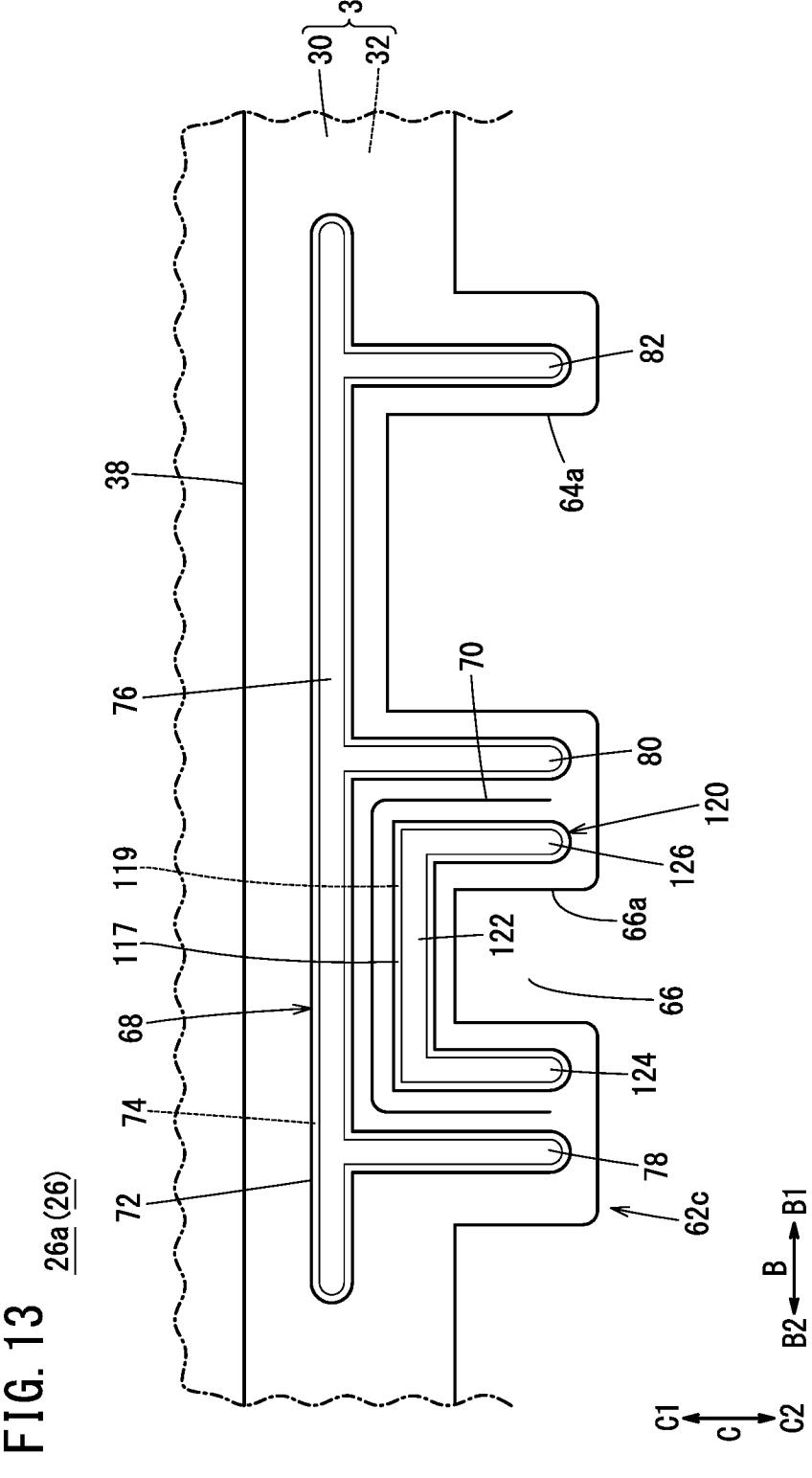
FIG. 13 is an explanatory plan view of a first positioning portion according to a third modification.

As shown in FIG. 13, a first positioning portion 62c according to a third modification includes the reinforcing rib 68, the joint portion 70, and an additional rib 120. The additional rib 120 is located between the first positioning hole 66 and the joint portion 70. The additional rib 120 extends linearly along the outline of the first positioning hole 66.

The additional rib 120 includes a first rib 117 and a second rib 119. The first rib 117 is configured in the same manner as the above-described first rib 72. That is, the first rib 117 protrudes from the first metal separator 30 toward the first MEA member 28a. The first rib 117 is integrally formed with the first metal separator 30 by press forming.

The second rib 119 is configured in the same manner as the above-described second rib 74. That is, the second rib 119 protrudes from the second metal separator 32 toward the second MEA member 28b. The second rib 119 is integrally formed with the second metal separator 32 by press forming.

The additional rib 120 includes a first part 122, a second part 124, and a third part 126. The first part 122 is located between the first linear rib 76 of the reinforcing rib 68 and the first positioning hole 66. The first part 122 extends in parallel with the first linear rib 76.

The second part 124 extends from one end portion of the first part 122 toward the outer periphery of the joint separator 33. The second part 124 is located between the second linear rib 78 of the reinforcing rib 68 and the first positioning hole 66. The second part 124 extends in parallel with the second linear rib 78. The third part 126 extends from the other end portion of the first part 122 toward the outer periphery of the joint separator 33. The third part 126 is positioned between the second linear rib 80 of the reinforcing rib 68 and the first positioning hole 66. The third part 126 extends in parallel with the second linear rib 80.

In the present modification, the first positioning portion 62c includes the additional rib 120 located between the first positioning hole 66 and the reinforcing rib 68 and protruding in the separator thickness direction from the first metal separator 30 and the second metal separator 32.

According to such a configuration, the rigidity of the first positioning portion 62c can be further increased by the additional rib 120.

The present modification is not limited to the configuration described above. The first positioning portion 62c may include, instead of the joint portion 70, the joint portion 70a or the plurality of joint portions 70b and 70c described above.

(Fourth Modification)

Figure 14:
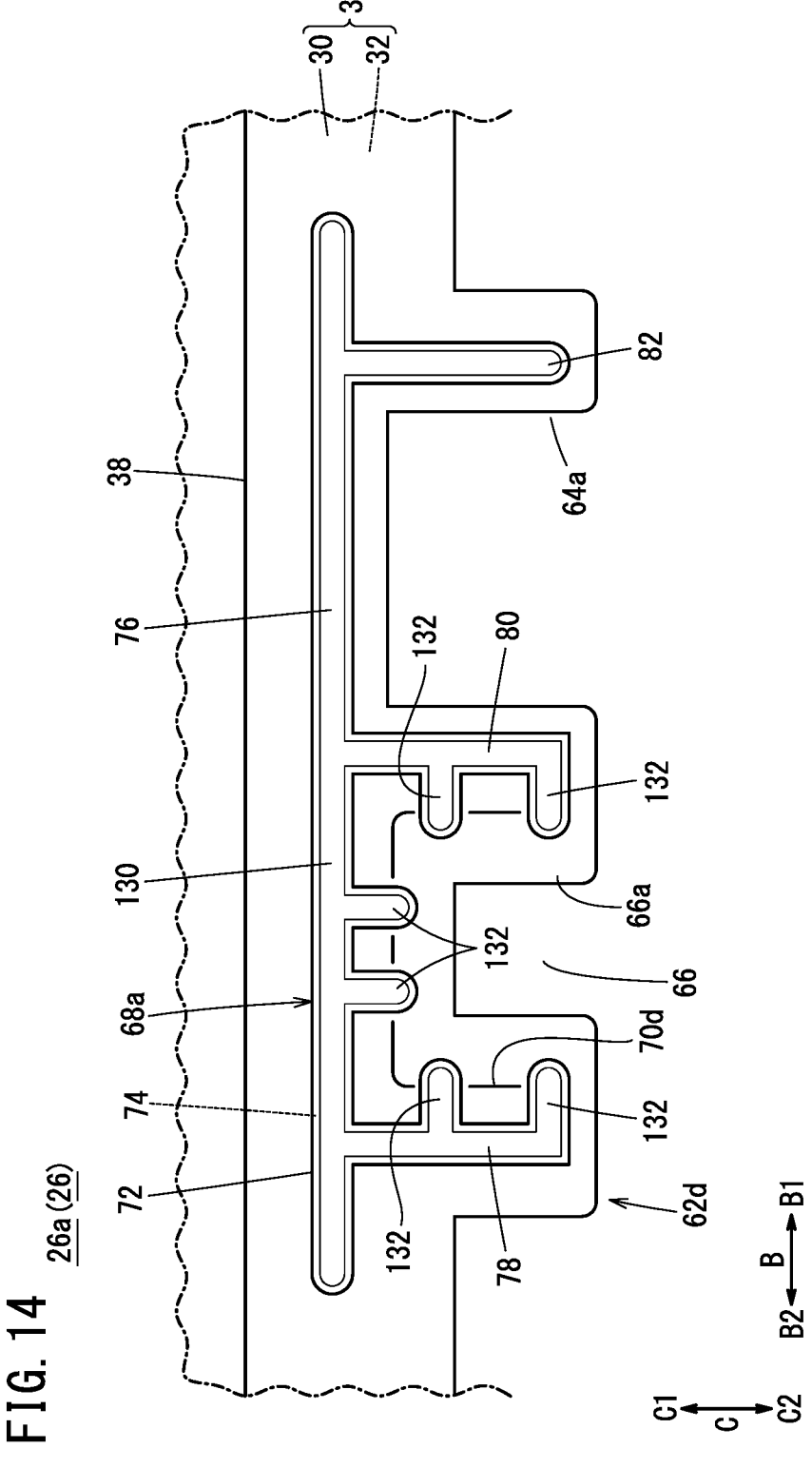
FIG. 14 is an explanatory plan view of a first positioning portion according to a fourth modification.

As shown in FIG. 14, a first positioning portion 62d according to a fourth modification includes a reinforcing rib 68a and a plurality of joint portions 70d. The reinforcing rib 68a includes a rib body 130 and a plurality of extending ribs 132. The rib body 130 has a similar shape to that of the reinforcing rib 68 described above. Specifically, the rib body 130 includes the first linear rib 76, and the plurality of second linear ribs 78, 80, and 82. The rib body 130 extends in a shape corresponding to the outline of the first positioning hole 66.

The plurality of extending ribs 132 extend from the rib body 130 toward the first positioning hole 66. In the present modification, the first positioning portion 62d includes six extending ribs 132. Two of the extending ribs 132 extend in a straight line shape from the first linear rib 76 toward the first positioning hole 66. Two of the extending ribs 132 extend in a straight line shape from the second linear rib 78 toward the second linear rib 80. Two of the extending ribs 132 extend in a straight line shape from the second linear rib 80 toward the second linear rib 78.

The plurality of joint portions 70d are each located between the extending ribs 132 adjacent to each other. In the present modification, the first positioning portion 62d includes five joint portions 70d. The joint portions 70d are separated from the extending ribs 132.

The reinforcing rib 68a includes the rib body 130 and the extending ribs 132. The rib body 130 extends in a shape corresponding to the outline of the first positioning hole 66. The extending ribs 132 extend from the rib body 130 toward the first positioning hole 66.

According to such a configuration, the rigidity of the first positioning portion 62d can be efficiently increased by the reinforcing rib 68a.

The plurality of extending ribs 132 are provided on the rib body 130. The joint portions 70d are each located between the extending ribs 132 adjacent to each other.

According to such a configuration, the rigidity of a portion of the first positioning portion 62d between the extending ribs 132 adjacent to each other can be increased by the joint portion 70d.

The present invention is not limited to the above-described embodiment and modifications, and various configurations can be adopted therein without departing from the essence and gist of the present invention.

The present embodiment discloses the following contents.

The above embodiment discloses the fuel cell separator member (26) comprising the joint separator (33) that comprises the pair of metal separators (30, 32) joined together, the joint separator including the outer peripheral portion provided with the positioning portion (62, 62a, 62b, 62c, 62d) configured to position the plurality of stack units (29) in the direction orthogonal to the separator thickness direction when the stack units are stacked on each other, the stack units each including the joint separator and the MEA member (28), wherein the positioning portion is formed with the positioning hole (66) formed by cutting out the outer peripheral portion of the joint separator so as to open toward the outside of the joint separator, and the positioning portion includes: the reinforcing rib (68, 68a) extending linearly outside the positioning hole and protruding in the separator thickness direction from at least one of the pair of metal separators; and the joint portion (70, 70a, 70b, 70c, 70d) located between the reinforcing rib and the positioning hole and configured to join together the pair of metal separators.

In the above-described fuel cell separator member, the joint portion may extend linearly along the outline of the positioning hole.

In the above-described fuel cell separator member, the joint portion may extend in a straight line shape or a wavy shape.

In the above-described fuel cell separator member, the joint portion may be provided in plurality between the reinforcing rib and the positioning hole.

In the above-described fuel cell separator member, the positioning portion may include the additional rib (120) located between the positioning hole and the reinforcing rib and protruding in the separator thickness direction from one of the pair of metal separators.

In the above-described fuel cell separator member, the reinforcing rib may include the rib body (130) extending in a shape corresponding to the outline of the positioning hole, and the extending rib (132) extending from the rib body toward the positioning hole.

In the above-described fuel cell separator member, the extending rib may be provided in plurality on the rib body, and the joint portion may be located between the extending ribs adjacent to each other.

The above embodiment discloses the fuel cell stack (10) including the stacked body (12) that comprises the plurality of stack units stacked on each other, the stack units each including the MEA member and the separator member, wherein the separator member is the above-described fuel cell separator member.

The above embodiment discloses the fuel cell stack including the stacked body that comprises the first MEA member (28a), the first separator member (26a), the second MEA member (28b), and the second separator member (26b) that are stacked in this order, wherein each of the first separator member and the second separator member is the above-described fuel cell separator member, the cutout portion (64) is formed in the outer peripheral portion of the joint separator, at a position adjacent to the positioning portion so as to open toward the outside of the joint separator, the cutout portion is larger than the positioning hole, and when viewed in a stacking direction of the first MEA member, the first separator member, the second MEA member, and the second separator member, the outline of the positioning hole of the first separator member is located inside the outline of the cutout portion of the second separator member, and the outline of the positioning hole of the second separator member is located inside the outline of the cutout portion of the first separator member.

The invention claimed is:

1. A fuel cell separator member comprising a joint separator that comprises a pair of metal separators joined together, the joint separator including an outer peripheral portion provided with a positioning portion configured to position a plurality of stack units in a direction orthogonal to a separator thickness direction when the stack units are stacked on each other, the stack units each including the joint separator and a membrane electrode assembly member, wherein the positioning portion is formed with a positioning hole formed by cutting out the outer peripheral portion of the joint separator so as to open toward an outside of the joint separator, and the positioning portion includes:

a reinforcing rib extending linearly outside the positioning hole and protruding in the separator thickness direction from at least one of the pair of metal separators; and a joint portion located between the reinforcing rib and the positioning hole and configured to join together the pair of metal separators.

2. The fuel cell separator member according to claim 1, wherein the joint portion extends linearly along an outline of the positioning hole.

3. The fuel cell separator member according to claim 2, wherein the joint portion extends in a straight line shape or a wavy shape.

4. The fuel cell separator member according to claim 3, wherein the joint portion is provided in plurality between the reinforcing rib and the positioning hole.

5. The fuel cell separator member according to claim 1, wherein the positioning portion includes an additional rib located between the positioning hole and the reinforcing rib and protruding in the separator thickness direction from one of the pair of metal separators.

6. The fuel cell separator member according to claim 1, wherein the reinforcing rib includes:

a rib body extending in a shape corresponding to an outline of the positioning hole; and an extending rib extending from the rib body toward the positioning hole.

7. The fuel cell separator member according to claim 6, wherein the extending rib is provided in plurality on the rib body, and the joint portion is located between the extending ribs adjacent to each other.

8. A fuel cell stack comprising a stacked body that comprises a plurality of stack units stacked on each other, the stack units each including a membrane electrode assembly member and a separator member, wherein the separator member is a fuel cell separator member including a joint separator that comprises a pair of metal separators joined together, the joint separator including an outer peripheral portion provided with a positioning portion configured to position the stack units in a direction orthogonal to a separator thickness direction when the stack units are stacked on each other, the positioning portion is formed with a positioning hole formed by cutting out the outer peripheral portion of the joint separator so as to open toward an outside of the joint separator, and the positioning portion includes:

a reinforcing rib extending linearly outside the positioning hole and protruding in the separator thickness direction from at least one of the pair of metal separators; and a joint portion located between the reinforcing rib and the positioning hole and configured to join together the pair of metal separators.

9. A fuel cell stack comprising a stacked body that comprises a first membrane electrode assembly member, a first separator member, a second membrane electrode assembly member, and a second separator member that are stacked in this order, wherein each of the first separator member and the second separator member is a fuel cell separator member including a joint separator that comprises a pair of metal separators joined together, the joint separator including an outer peripheral portion provided with a positioning portion configured to position a plurality of stack units in a direction orthogonal to a separator thickness direction when the stack units are stacked on each other, the stack units each including the joint separator and the first membrane electrode assembly member or the second membrane electrode assembly member, the positioning portion is formed with a positioning hole formed by cutting out the outer peripheral portion of the joint separator so as to open toward an outside of the joint separator, the positioning portion includes:

a reinforcing rib extending linearly outside the positioning hole and protruding in the separator thickness direction from at least one of the pair of metal separators; and a joint portion located between the reinforcing rib and the positioning hole and configured to join together the pair of metal separators, and wherein a cutout portion is formed in the outer peripheral portion of the joint separator, at a position adjacent to the positioning portion so as to open toward the outside of the joint separator, the cutout portion is larger than the positioning hole, and when viewed in a stacking direction of the first membrane electrode assembly member, the first separator member, the second membrane electrode assembly member, and the second separator member, an outline of the positioning hole of the first separator member is located inside an outline of the cutout portion of the second separator member, and an outline of the positioning hole of the second separator member is located inside an outline of the cutout portion of the first separator member.

* * * * *